Jan. 19, 1965    L. O. VARGADY    3,166,624
MOIRE FRINGE DEVICE HAVING LINE GRIDS
OF GRADUALLY CHANGING PITCH

Filed May 5, 1961             2 Sheets-Sheet 1

INVENTOR.
LESLIE O. VARGADY
BY *Frank C. Parker*
*David E. Dougherty*
ATTORNEYS

INVENTOR.
LESLIE O. VARGADY
BY Frank C. Parker
David E. Dougherty
ATTORNEYS

United States Patent Office 3,166,624
Patented Jan. 19, 1965

3,166,624
MOIRE FRINGE DEVICE HAVING LINE GRIDS OF GRADUALLY CHANGING PITCH
Leslie O. Vargady, Rochester, N.Y., assignor to Bausch & Lomb Incorporated, Rochester, N.Y., a corporation of New York
Filed May 5, 1961, Ser. No. 108,021
2 Claims. (Cl. 88—1)

This invention relates to improved methods of and devices for producing moire fringes, and to improved measuring devices utilizing them.

Moire fringe effects are well known and have been previously proposed for use in measuring devices. See for example U.S. Patent No. 1,415,627 issued to G. E. Giambiasi, May 9, 1922, and Nos. 2,390,122 and 2,451,972 issued to W. P. Powers, December 4, 1945, and October 19, 1948, respectively. Previously known moire fringe devices have been subject to certain limitations in use and have not found wide acceptance. With the current advent of relatively high precision measurement techniques, however, moire fringe devices appear to warrant further development and investigation.

Accordingly, one important object of the present invention is to improve methods of and devices for producing and using moire fringes.

Other objects are: To provide novel moire fringe devices which are relatively easy and simple to read and which provide reliable, accurate measurement indications; to provide improved devices of this type which produce novel fringe patterns and present minimum opportunity for ambiguity in their measurement indications; to provide improved moire fringe devices which are capable of a relatively high degree of motion magnification, yet are relatively simple, easy and unambiguous to read; and in general to provide novel moire fringe constructions which are relatively simple and inexpensive to manufacture and readily adaptable for use in many different kinds of measuring devices.

The foregoing and other objects and advantages of the invention will become apparent in the following detailed description of representative embodiments thereof, taken in conjunction with the drawings, wherein.

Briefly, according to a first feature of the invention, it has now been found that by using a pair of grids in which the widths of the lines differ from the widths of the spaces between the lines, one of the grids being a contrast, or phase reversal of the other, relatively narrow and sharply defined fringes may be produced with an improved contrast characteristic relative to grids having lines and spacings of equal widths.

A second feature of the invention relates to a novel method of producing fringes for measurement purposes by optically superimposing images of moving grids. One image is projected in direct form, and the other is reversed by optical means, so that both grids may be carried on the same member and moved together, thus minimizing the possibility of errors due to misalignment. Due to their relative reversal, the images travel in opposite directons, thus producing the fringes.

The third feature relates to a novel gradient, or graded grid arrangement for producing novel moire fringe effects. The grids according to this feature of the invention are graded in pitch along their length, that is, in the direction normal to the grid lines, which are parallel to each other. The grids are used in pairs, with their lines either substantially parallel or at a slight angle to each other. When the grids are crossed, or angularly displaced, the fringes produced are in a fan-like pattern, being narrowest and most closely spaced at the relatively finely pitched ends of the grids, and being divergent in the direction of the relatively coarsely pitched ends of the grids . When the grids are arranged with their lines parallel to each other, they produce parallel fringes of varying spacing, and are well suited for use in instruments of the automatic readout type, because when they are precisely superimposed and in register with one another, they exhibit a unique relative position in which they have either maximum or minimum light transmission, depending upon whether the grids are identical or are phase, or contrast reversals of each other.

Figure 1:
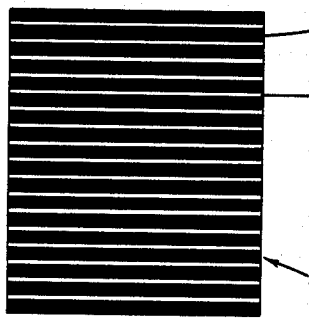
FIG. 1 is an elevational view of a line grid for use in a moire fringe device according to the invention.
Figure 2:
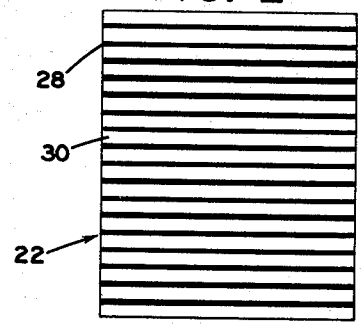
FIG. 2 is an elevational view of a second line grid for use in a moire fringe device according to the invention.
Figure 3:
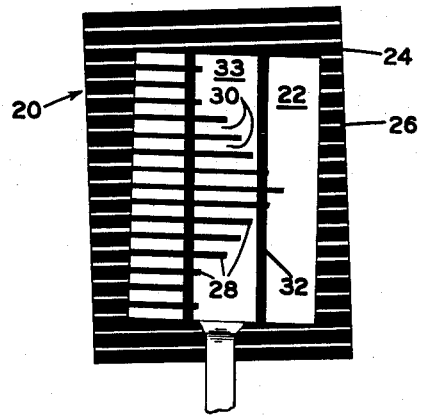
FIG. 3 is a schematic view illustrating the nature of the fringes obtained when the grids of FIGS. 1 and 2 are superimposed, with their lines at a relatively small angular displacement relative to each other.

Referring to the drawings, FIGURES 1–3 illustrate a grid arrangement according to a first embodiment of the invention for producing relatively sharply defined and narrow fringes separated by relatively wide intervals. The two grids 20 and 22 are designed as illustrated in FIGURES 1 and 2, respectively, with different line and spacing widths, but of the same pitch. The first grid 20 has relatively wide lines 24 separated by relatively narrow intervals 26, and the second grid 22 is the phase reversal, or contrast image of the first grid 20. The lines 28 of the second grid 22 are relatively narrow and of the same width as the intervals 26 of the first grid. The intervals 30 of the second grid 22 are relatively wide and of the same width as the lines 24 of the first grid. When the two grids, 20 and 22 are superimposed, as shown in FIGURE 3, in parallel planes, with their lines angularly displaced relative to each other, the fringe pattern produced is one of relatively sharply defined, narrow fringes 32, separated by relatively wide intervals 33.

As illustrated in FIG. 3, the two superimposed grids are arranged with their lines generally horizontal and displaced from each other at a relatively small angle such as, for example, about 3°. The fringes 32 appear to run in the direction of the bisector of the angle between the lines 24 and 28 of the respective grids, that is, generally vertically and appear to move horizontally, that is, from left to right, in response to relative vertical movement between the two grids. In a measuring instrument, one of the grids, say the first grid 20, would ordinarily be fixed in position relative to the instrument frame, and the other one of the grids would be movable in the direction of the bisector of the angle between the grid lines.

In this arrangement the number of the fringes, their spacings, on centers (the fringe pitch) and the motion magnification, that is, the ratio of the lateral travel of the fringes to the vertical motion of the grids are all exactly similar to the prior art moire fringe devices using grids having the same pitch as the present grids and the same angular displacement. The improvement brought about by the practice of this feature of the invention has to do with an increased contrast of the fringes relative to the background illumination, and their increased sharpness of definition, which make the fringes more readily recognizable and more susceptible to automatic and visual counting techniques.

Figure 4:
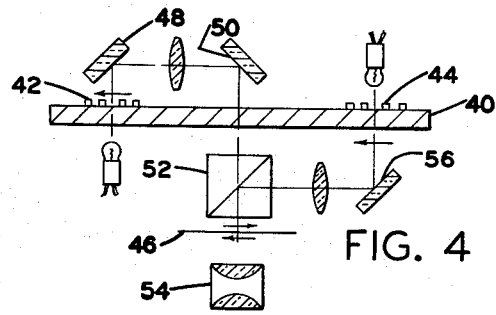
FIG. 4 is a schematic, longitudinal, sectional view of a moire finge device according to another embodiment of the invention, illustrating one arrangement for optically superimposing two grid images to produce moire fringes without relative motion between two grids.
Figure 5:
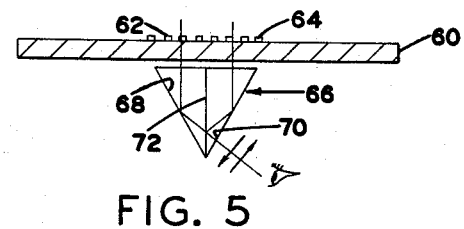
FIG. 5 is a longitudinal, sectional view illustrating a second arrangement for optically superimposing grid images to produce moire fringes.

FIGS. 4 and 5 illustrate two alternative methods according to the present invention for producing moire fringe patterns without relative motion between two grids. In these arrangements the grids are lined upon a single transparent base, and are optically imaged upon each other in a common plane. One image is optically reversed relative to the other, so that, in response to motion of the base, the two images move in opposite directions, thus producing moire fringes with double the normal motion magnification. The grids may be of any desired type such as regular grids having uniform line and interval widths or grids similar to those hereinabove described with respect to FIGS. 1, 2, and 3.

The transparent movable base 40 shown in FIG. 4 may be fixed to the stylus or other sensing member of a measuring device such as, for example, a height gage, and mounted by any desired means for smoothly guided travel in the direction of its length. The transparent base 40 carries two grid portions 42 and 44, respectively, which are schematically shown as embossed transverse lines, and optical means are provided for imaging the grid portions in a common plane upon each other. The imaging rays from the first grid portion 42 are reflected by two additive 45° mirrors 48 and 50, respectively, the combined effects of which produce an image reversal, and then proceed through a beam divider 52 to the image plane 46, where they may be viewed by any desired means such as through an eyepiece 54. The imaging rays from the second grid portion 44 are reflected first by a 45° mirror 56 and then by the beam divider 52, into the image plane 46 in coincidence with the image of the first grid portion 42. The first mirror 56 is mounted parallel to the beam divider 52, so there is no image reversal due to the two reflections of the imaging rays from the second grid portion 44.

The images of the respective grid portions 42 and 44 may be viewed by any desired means such as through the eyepiece 54 shown, or, alternatively, they may be projected upon a screen (not shown). The arrangement produces reversal of one image relative to the other so that the two images of the respective grid portions 42 and 44 travel in opposite directions in response to motion of the transparent base 40, thus producing moire fringes in accordance with known moire fringe principles.

An alternative image reversing arrangement is illustrated in FIGURE 5, in which there is shown a transparent movable base 60 having two grid portions 62 and 64, respectively, on its surface, similar to the transparent base 40. In this arrangement, relative image reversal of the two grid portions 62 and 64 is accomplished by means of a prism 66 generally similar to a Koster prism, which includes two internally reflecting surfaces 68 and 70, respectively, and a beam divider surface 72 of the semi-transparent and semi-reflective type. The first grid portion 62 is viewed by transmission through the dividing surface 72, with a single reflection taking place upon the first internally reflecting surface 68. The second grid portion 64 is viewed with two reflections, the first taking place at the internally reflecting surface 70, and the second at the beam divider surface 72. Since the view ray paths for the two grid portions 62 and 64, respectively, are of equal length, there is no need in this instance to provide for imaging means to image the grid portions into a common plane, but such means may be provided if desired, particularly for remote viewing, and when it is desired to provide for magnification. The principal feature here is that the apparent motion as viewed by the observer of the one grid portion 62 is in the reverse direction from the apparent motion of the other grid portion 64, as required for the production of moire fringes.

Figure 6:
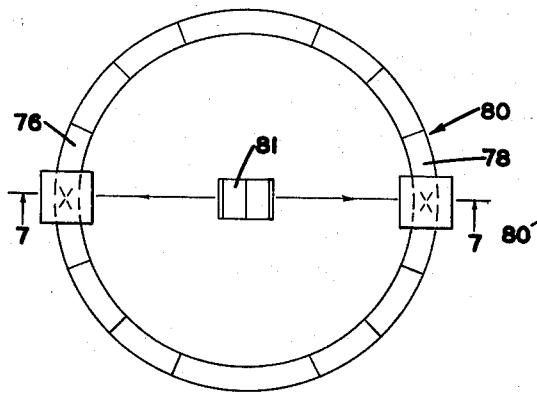
FIG. 6 is a plan view of a moire fringe arrangement for measuring rotation according to the invention, using the principle of optical superpositioning of grid images.
Figure 7:
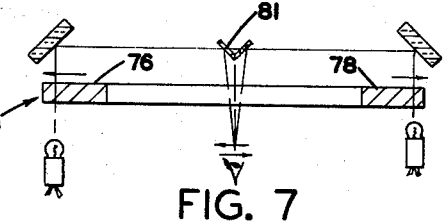
FIG. 7 is a cross sectional view taken along the line 7—7 of FIG. 6.

The two embodiments of the invention illustrated in FIGS. 4 and 5 provide for optical inversion of the motion of one grid portion relative to a second grid portion when both grid portions are moved rectilinearly along the same path in the same direction. The embodiment illustrated in FIGS. 6 and 7 is arranged for measuring rotation, or angular displacement, and the two grid portions 76 and 78 are mounted in diametrical opposition upon a common, ring-like transparent base 80. Provision is made for simultaneously viewing both of the grid portions 76 and 78 without relative image reversal, the moire fringe motion produced in response to rotation of the base 80 being due to the opposite directions of motion of the opposite sides of the ring base 80. The two grid portions 76 and 78 are viewed simultaneously by means of a centrally located double mirror 81 in an arrangement which produces similar optical inversion for both of the grid portions 76 and 78.

Figure 8:
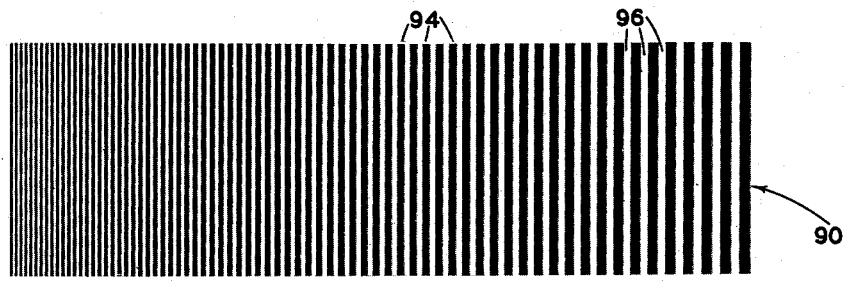
FIG. 8 is an elevational view of a graded, or gradient grid according to a further embodiment of the invention.

FIGS. 8–11 illustrate the graded, or gradient grid principle of the present invention. FIG. 8 shows a graded grid 90 having alternate opaque lines 94 and transparent or clear intervals 96. As shown, the pitch of the grid 90 varies along its length in the direction transverse to the length of the lines 94 and the intervals 96, the pitch being relatively large at the left-hand end and relatively small at the right-hand end of the grid. The term pitch as used herein is meant to include the width of one grid line and its adjacent interval. The variation in pitch may be made as desired, depending upon the shape of the fringes it is desired to produce. The respective intervals 96 may be equal in width to the widths of the lines adjacent to them, or they may be of different widths as described in connection with the embodiments illustrated in FIGS. 1–3, or, alternately, in the event it is desired to maximize the definition and contrast of the fringes, the line-interval arrangement may be as described and claimed in the copending application of Richard Pegis, entitled, "Grids for Producing Moire Fringes," Serial No. 108,162, filed concurrently herewith, and assigned to the present assignee.

If the fringe pitch varies linearly along the length of the grid, the fringes produced when two of the grids are superpositioned at an angle to each other will be strraight. If the fringe pitch varies according to a nonlinear function, the fringes produced by crossing two of them will be curved accordingly.

Figure 9:
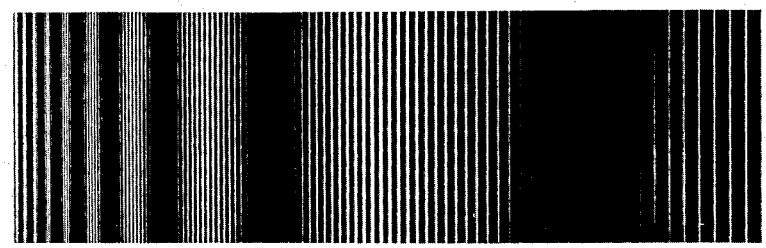
FIG. 9 is an elevational view showing two graded, or gradient grids superimposed with their grid lines parallel.

FIG. 9 illustrates the fringe pattern produced by a pair of grids, similar to the grid 90 illustrated in FIG. 8 when they are superimposed with their lines parallel, but out of register with each other. In this case the fringes move in the direction of relative motion between the two grids 90 and at a magnified rate.

One important advantage of this grid arrangement is that it provides a unique indication when the two paired grids are precisely in register with each other. In the case of regular grids superimposed in parallel relation, the same light transmission is observed in a repetitive sequence as they are moved relative to each other. In the present case, with similar graded, or gradient grids, light transmission is at a maximum only when the two grids are exactly in register, with the lines of one grid lying directly beneath, or behind the corresponding lines of the other grid. At all other relative positions, light transmission is at a smaller value. With graded grids that are phase, or contrast reversals of each other, light transmission is totally obscured when they are in exact register, and there is always some transmission for all other relative positions.

This effect makes the gradient grid arrangement well suited for use in automatic null detecting devices, because it avoids the possibility of ambiguity such as is possible with regularly arranged grids, which give similar light transmission effects at successive intervals ocrresponding to their pitches.

Figure 10:
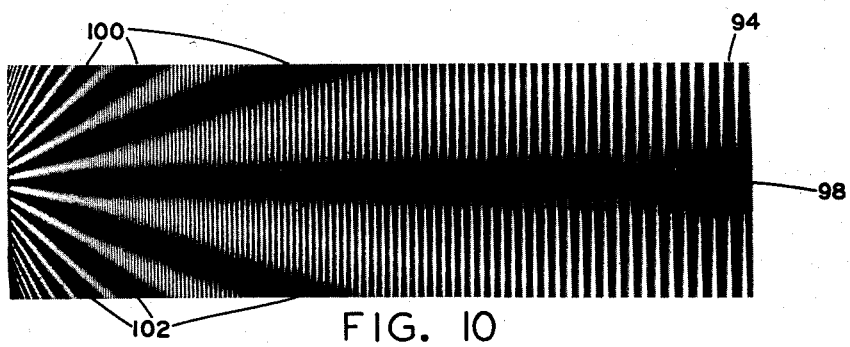
FIG. 10 is an elevational view showing a pair of superimposed gradient grids with their lines slightly angularly displaced, and illustrating the type of fringe pattern produced thereby.

FIG. 10 illustrates the fringe pattern produced by a pair of graded grids, which are negative copies, or contrast reversals of each other, when they are superimposed with their lines at a small relative inclination. The fringes are fan-shaped in arrangement and include a principal fringe 98 extending along the bisector of the angle between the grid lines 94 of the respective grids. This principal fringe 98 moves laterally of itself, generally parallel to the grid lines in response to relative motion in the perpendicular direction between the two grids 90, and the upper and lower auxiliary fringes 100 and 102, respectively, move with the principal fringe 98 in response to such relative motion between the two grids.

When the two grids 90 are most closely aligned with each other, that is, when the lines of one grid cross the corresponding intervals of the other grid at about their mid-points, the main fringe 98 is centrally located along the two grids as shown in FIG. 10. As the grids are moved relative to each other in the direction of their length (along the length of the principal fringe 98) the principal fringe 98 moves across the grids, and when sufficient displacement occurs, the principal fringe 98 passes beyond the edge of the grids and disappears. However, the direction of corrective motion required to bring the main fringe 98 back into the field of the two grids will still be indicated by the inclination of the remaining auxiliary fringes 100 or 102, thereby enabling the operator of the instrument in which the grids are used to initiate the proper correction immediately without trial and error. When, for example, the principal fringe 98 disappears beyond the lower edge of the grid field, the lower auxiliary fringes 102 disappear with it, and only the upper auxiliary fringes 100 remain in the field. These fringes 100 slant upwardly to the right as viewed in FIGURE 10, thus indicating one direction of relative motion between the grids for bringing the fringe 98 back into the field. When the principal fringe 98 disappears off the screen beyond the upper edge of the grid field, the upper auxiliary fringes 100 disappear along with it, leaving only the lower auxiliary fringes 102 in the field of view. These lower auxiliary fringes 102 slant downwardly to the right, thus indicating the opposite direction of grid motion to bring the principal fringe 98 back into the field.

As hereinabove stated, the fringe pattern shown in FIG. 10 is produced by a pair of graded grids that are negative copies of each other, with the lines of each one of the grids being equal in width to the intervals of the other one. If two identical graded grids are used in such a crossed arrangement, the principal fringe 98 is absent, and in its place there is a region of maximum light transmission, which may be referred to as a fringe interval. The effect is to produce a fringe pattern which is a negative copy, or contrast reversal of the fringe pattern shown in FIG. 10.

Figure 11:
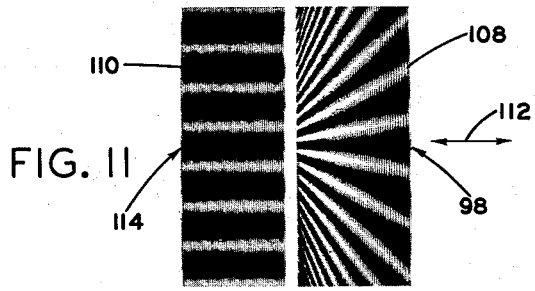
FIG. 11 is a schematic diagram illustrating a pointer type fringe effect achieved in the practice of the invention by using a pair of gradient grids in conjunction with a pair of regular grids.

The ease and accuracy of reading the fringe indications provided by the crossed gradient grid arrangement illustrated in FIG. 10 may be further improved by utilizing the gradient grid and the regular grid principles in combination as illustrated in FIG. 11. In this illustration, a pair of grids each comprising a gradient portion on the right side designated by reference numeral 108 and a regular portion on the left side designated by reference numeral 110, all of the lines of each grid being parallel, and the two grids being superimposed with their lines at a relatively small inclination to each other. The grids are arranged for relative motion between each other in the direction of the double arrow 112, and the fringes move perpendicularly to the arrow in response to the grid motion. The principal fringe 98 formed by the gradient grid portions remains always in alignment with the same one of the regularly spaced fringes 114 produced by the regular grid portions. This arrangement is advantageous in that it facilitates fringe counting, the regularly spaced fringes 114 being less apt to confuse than the diverging auxiliary fringes 100 and 102 of the gradient grid patterns. The arrangement also provides a better visual pattern for estimating the fractional displacement between the one of the fringes 114 opposite the principal fringe 98 and an index mark (not shown).

It may also be pointed out that the arrangement illustrated in FIG. 11 is readily adjustable to provide different degrees of sensitivity, or motion magnification by varying the inclination between the two grids, thereby varying the spacings between the regular fringes 114 and the movement of the fringes in response to a given relative motion between the two grids.

What is claimed is:

1. A moire fringe device comprising a pair of superimposed similar line grids having parallel spaced lines and clear intervals, the width of a grid line and its adjacent interval defining a pitch, and the pitch of said grids having a gradually increasing dimension transverse of the grid, corresponding lines and intervals of the respective grids being of substantially equal widths, and means movably mounting said grids in a superimposed position with their respective grid lines at a small inclination to each other for movement substantially normal to the grid lines of one of the line grids whereby a fan-like fringe is generated.

2. A moire fringe device according to claim 1 in which said grids are negative copies of each other.

References Cited in the file of this patent

UNITED STATES PATENTS

| 2,016,036 | Fitz Gerald | Oct. 1, 1935 |
| 2,886,717 | Williamson et al. | May 12, 1959 |

FOREIGN PATENTS

| 476,720 | Canada | Sept. 4, 1951 |
| 782,831 | Great Britain | Sept. 11, 1957 |

OTHER REFERENCES

Girard: "Nouveaux dispositifs de spectroscopie a grande luminosite," Optica Acta, vol. 7, No. 1, January 1960, pp. 81–97, pages 92–97 of interest.